United States Patent
Angus et al.

(10) Patent No.: US 10,083,325 B2
(45) Date of Patent: Sep. 25, 2018

(54) SECURE REMOVABLE STORAGE FOR AIRCRAFT SYSTEMS

(71) Applicant: THE BOEING COMPANY, Chicago, IL (US)

(72) Inventors: Ian Gareth Angus, Mercer Island, WA (US); Rodolfo Acuna Santiago, Bellevue, WA (US)

(73) Assignee: THE BOEING COMPANY, Chicago, IL (US)

( * ) Notice: Subject to any disclaimer, the term of this patent is extended or adjusted under 35 U.S.C. 154(b) by 143 days.

(21) Appl. No.: 14/942,680

(22) Filed: Nov. 16, 2015

(65) Prior Publication Data

US 2017/0140175 A1    May 18, 2017

(51) Int. Cl.
| | |
|---|---|
| *G06F 21/78* | (2013.01) |
| *G06F 21/60* | (2013.01) |
| *G06F 21/64* | (2013.01) |
| *H04L 9/08* | (2006.01) |
| *H04L 29/06* | (2006.01) |

(52) U.S. Cl.
CPC ............ *G06F 21/78* (2013.01); *G06F 21/602* (2013.01); *G06F 21/64* (2013.01); *H04L 9/0822* (2013.01); *H04L 9/0861* (2013.01); *H04L 9/0894* (2013.01); *H04L 9/0897* (2013.01); *H04L 63/06* (2013.01); *H04L 63/168* (2013.01); *G06F 2221/2131* (2013.01)

(58) Field of Classification Search
CPC ........ G06F 21/78; G06F 21/602; G06F 21/64; H04L 9/0822; H04L 9/0861; H04L 9/0897; H04L 63/06; H04L 63/168
See application file for complete search history.

(56) References Cited

U.S. PATENT DOCUMENTS

| | | | |
|---|---|---|---|
| 2002/0077985 A1* | 6/2002 | Kobata | G06F 21/10 705/51 |
| 2007/0186109 A1 | 8/2007 | Nyberg et al. | |
| 2011/0166749 A1* | 7/2011 | Muirhead | B64D 11/064 701/36 |

(Continued)

FOREIGN PATENT DOCUMENTS

EP    1855414 A1    11/2007

OTHER PUBLICATIONS

Barker et al., "Recommendation for Cryptographic Key Generation", Dec. 2012, NIST Special Publication 800-133, http://dx.doi.org/10.6028/NIST.SP.800-133, Computer Security, National Institute of Standard and Technology, U.S. Department of Commerce.*

(Continued)

*Primary Examiner* — Kambiz Zand
*Assistant Examiner* — Tongoc Tran
(74) *Attorney, Agent, or Firm* — Patterson + Sheridan, LLP (57) ABSTRACT

Techniques are disclosed for securing backup operational data (e.g., of an aircraft) maintained by a line-replaceable unit (LRU) in a removable storage media device. The LRU generates a first encryption key. The LRU encrypts the operational data using the first encryption key. The LRU generates a second encryption key based on key data of at least a second LRU. The LRU encrypts the first encryption key using the second encryption key.

21 Claims, 8 Drawing Sheets

(56) References Cited

U.S. PATENT DOCUMENTS

| | | | |
|---|---|---|---|
| 2012/0124159 A1* | 5/2012 | Takahashi | H04N 7/17318 |
| | | | 709/213 |
| 2012/0216286 A1* | 8/2012 | Johnson | G06F 21/64 |
| | | | 726/26 |
| 2013/0046972 A1* | 2/2013 | Campagna | H04L 9/0841 |
| | | | 713/156 |
| 2013/0132548 A1* | 5/2013 | Cabos | H04L 67/16 |
| | | | 709/223 |
| 2015/0052369 A1 | 2/2015 | Koning et al. | |
| 2016/0127895 A1* | 5/2016 | Bangole | H04W 12/04 |
| | | | 380/279 |

OTHER PUBLICATIONS

Extended European Search Reported dated Mar. 14, 2017 for Application No./Patent No. 16184777.7-1870.

* cited by examiner

SECURE REMOVABLE STORAGE FOR AIRCRAFT SYSTEMS

BACKGROUND

Aspects presented herein generally relate to data security in closed communications systems (e.g. electronic systems used in aircraft, rail vehicles, and automobiles), and more specifically, to techniques for preserving security and integrity of backup data stored in removable storage media for such systems.

Modern modes of transportation are equipped with electronic and computer components that communicate and exchange information with one another. For example, an airplane may include a number of line-replaceable units (LRUs), which are devices that are networked within the airplane. Each LRU performs specific functions, such as managing communications between avionics systems and on-board equipment, providing connectivity between the airplane and ground networks (e.g., of a commercial airline), and providing wireless network access to the aircraft cabin. A given LRU is interchangeable and can be quickly replaced at an operating location in the event that the LRU fails (or is otherwise rendered unserviceable).

In some aircraft electronic and computer systems, one LRU serves as a single point of failure, i.e., the failure of that particular LRU may result in unacceptable data loss and consequently a loss of operation readiness. An example LRU includes a network file server that maintains information used to identify the aircraft to off-board or external maintenance systems. One approach to mitigating data loss is by backing up critical operational data via removable storage media attached to the LRU. Therefore, even if the LRU fails, the operational data remains intact on the removable storage media, which can then be inserted into a replacement LRU.

SUMMARY

One aspect presented herein describes a method. The method generally includes generating, by a first line-replaceable unit (LRU) in a plurality of LRUs, a first encryption key. The method also generally includes encrypting specified data using the first encryption key. The specified data is stored as backup data in a storage media device attachable to the first LRU. The method also includes generating, based on key data of at least a second LRU in the plurality of LRUs, a second encryption key. The first encryption key is encrypted using the second encryption key.

In one aspect, in combination above, the method also includes storing the encrypted specified data and the encrypted first encryption key in the storage media device. The encrypted specified data is stored in an encrypted partition of the storage media device. Further, the encrypted first encryption key is stored in an unencrypted partition of the storage media device. This method may also include generating, by a replacement LRU for the first LRU, the second encryption key based on the key data of at least the second LRU. The method also includes decrypting the encrypted first encryption key stored in the storage media device and the encrypted specified data. The method also includes restoring the specified data to the replacement LRU.

In one aspect, in combination with any example above, the plurality of LRUs operate in an airplane. Further, the specified data is operational data of the airplane.

In one aspect, in combination with any example above, prior to encrypting the first encryption key using the second encryption key, a message authentication code (MAC) is generated for one or more data sets maintained in the storage media device. The MAC is generated using the first encryption key as a signing key.

In one aspect, in combination with any example above, prior to generating the second encryption key, a Transport Layer Security (TLS) connection is initiated with at least the second LRU. The key data is retrieved from the second LRU via the TLS connection.

Moreover, aspects herein include any alternatives, variations, and modifications of the preceding arrangement or configurations of the methods recited above.

Other aspects include, without limitation, a non-transitory storage medium having computer-readable program code that enables a processing unit to implement one or more aspects of the disclosed methods as well as a system having a processor, memory, and application programs configured to implement one or more aspects of the disclosed methods.

DETAILED DESCRIPTION

Aspects presented herein disclose techniques for securing backup data used in closed communications systems, such as in aircraft communication systems. An airplane typically includes several line-replaceable units (LRU) that each perform a given function within the aircraft. Generally, an LRU is designed to allow relatively quick replacement in the event the LRU fails. Some LRUs store data that is critical to the operation of the airplane. For example, an airplane may include a network file server (NFS) LRU, which stores information used to identify the airplane to other systems (e.g., ground control systems, maintenance systems, etc.). Failure of this LRU results in significant data loss and loss of operational readiness of the airplane.

To address this issue, the LRU backs up the operational data to a removable storage media device. In one aspect, an operator may attach the storage media device to the LRU and copy the operational data to the device. In the event the LRU fails, the operator may remove the storage media device from the LRU and attach the device to a replacement LRU. The operator may then restore the operational data to that replacement LRU.

However, one concern with this approach is in securing the backup data from attackers. For instance, an attacker can remove the storage media device and copy the data, potentially leading to undesirable consequences (e.g., using the operational data to spoof the airplane identification and manipulate maintenance statistics, performing denial of service attacks on ground systems, etc.). To address this concern, the LRU can encrypt the data using an encryption algorithm, such as Advanced Encryption Standard (AES). Doing so prevents the data from being accessible without the correct AES encryption key.

Thus, under this approach, determining a location in which to store the encryption key becomes a concern. For instance, storing the key on the LRU is undesirable due to potential loss of the key in the event that the LRU fails. And storing the key on the storage media device in the clear is also undesirable, as an attacker who has access to the storage media device can also obtain the key from the device to decrypt the data.

Aspects provide techniques for generating a key used to wrap the AES encryption key. More specifically, techniques describe generating the wrapping key based on data that is distinct to the airplane. The data may include information used in a public key infrastructure (PKI) of the airplane, e.g., public keys associated with two or more other LRUs networked in the plane. Such data is private to the airplane and is accessible to a LRU used to replace one that has failed.

In one aspect, the LRU may encrypt the AES encryption key with the wrapping key and store the wrapped AES encryption key on the removable storage media device. Under this approach, the AES encryption key remains inaccessible to the attacker even if the attacker is able to copy the contents of the storage media device. Further, even if an attacker is able to compromise one of the LRUs to identify key information for that LRU, the attacker would nevertheless be unable to reproduce the wrapping key (due to the wrapping key being generated using other LRUs as seeds). If the LRU (that stores critical operational data) fails, the operator may attach the removable storage media device into a new LRU used to replace the failed LRU. The new LRU may regenerate the wrapping key using the same data originally used to generate this key. The LRU may then decrypt the wrapped AES key and recover the operational data.

Further, if any one of the other LRU fails, the LRU that stores critical operational data may regenerate the AES key and re-encrypt the operational data. Further, the LRU may generate a wrapping key using new data from the LRU replacing the failed LRU. Doing so narrows a window in which an attacker can obtain the public key information from the failed LRU.

In one aspect, the LRU may also use the AES encryption key as a signing key to preserve integrity of unencrypted data stored in the storage media device. That is, it may be desirable to detect whether an attacker has removed the storage media device and replaced the unencrypted data sets with false data. The LRU may use a message authentication code (MAC) algorithm using, as input, the AES encryption key (to serve as a secret key) and the unencrypted data set. The LRU may store the resulting MAC to the storage media device along with the data set. Further, the LRU may use the wrapping key to encrypt the AES key.

To prove the integrity of the data set, the LRU may decrypt the AES key using the techniques described above and compute the MAC using the AES key and the unencrypted data set as input. If the resulting MAC does not match with the MAC stored on the removable storage media device, then the data set has likely been tampered, and the LRU may return an error in response.

Advantageously, a LRU in an airplane may wrap an encryption key used to protect critical operational backup data and prove integrity of unencrypted data on a storage media device using a key generated based on PKI data associated with other LRUs in the airplane. The techniques provide an approach for backup data to remain secure even in the event that a single-point-of-failure LRU goes offline.

Note, the following uses line-replaceable units (LRUs) operating in an airplane as a reference example for securely storing sensitive backup data on a removable storage media device. However, one of skill in the art will recognize that aspects presented herein may be adapted to other types of closed-communications systems configured with a public key infrastructure of various modular components within the system. For example, aspects may be adapted to other modes of transportation, such as rail vehicles and automobiles having such systems. As another example, aspects may be adapted to industrial closed-communications systems, such as a SCADA (supervisory control and data acquisition) system.

Figure 1:
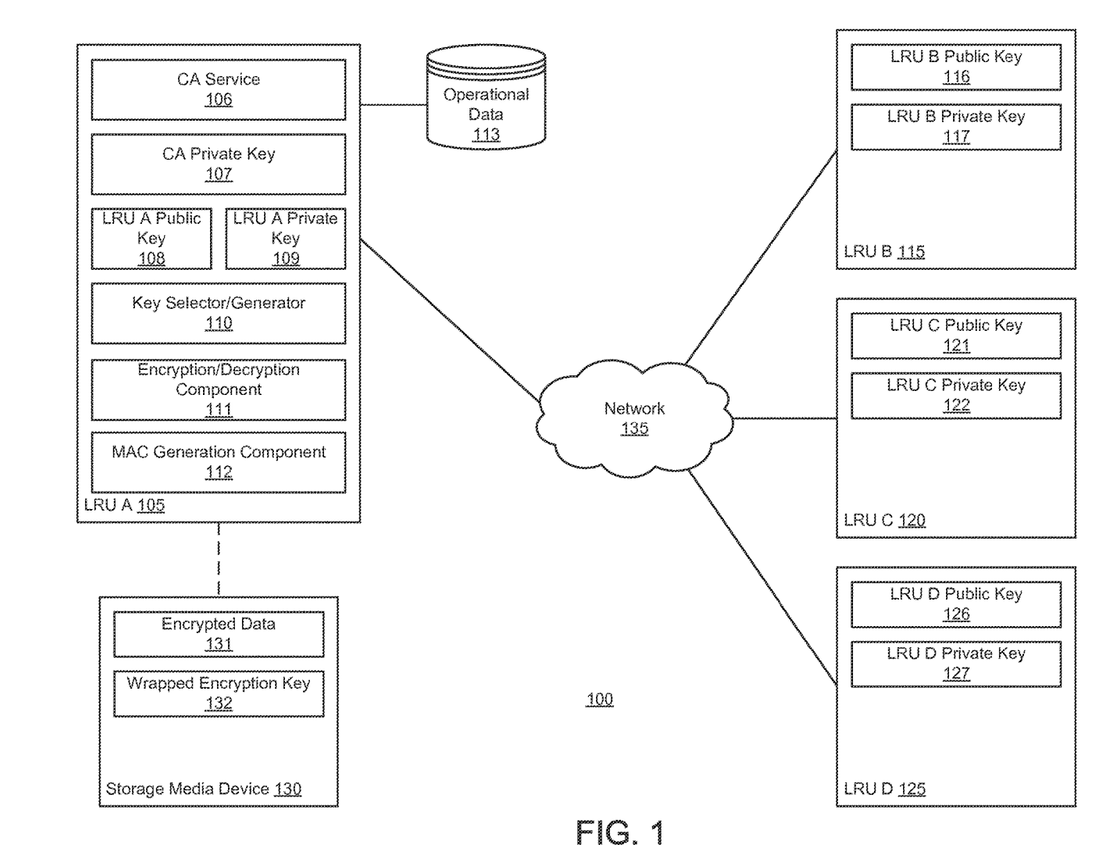
FIG. 1 illustrates an example computing environment, according to one aspect.

FIG. 1 illustrates an example computing environment 100, according to one aspect. As shown, the computing environment 100 includes a line-replaceable unit (LRU) A 105, LRU B 115, LRU C 120, LRU D 125, and a storage media device 130. The LRUs 105, 115, 120, and 125 are each interconnected via a network 135 (e.g., local area network (LAN)). In one aspect, the computing environment 100 is representative of cabin systems operating in an airplane. Of course, the components depicted in computing environment 100 are presented as examples, as the cabin systems will include additional components.

As shown, the LRU A 105 includes a certificate authority (CA) service 106, a CA private key 107, a LRU A public key 108, a LRU A private key 109, a key selector/generator 110, an encryption/decryption component 111, a message authentication code (MAC) generation component 112, and operational data 113. In one aspect, the LRU A 105 represents a network file server (NFS) for onboard network systems.

LRUs B 115, C 120, and D 125 may each represent component systems of the cabin systems architecture that perform various functions. For example, the LRU B 115 may represent a network extension device (NED) that provides network routing functions between avionics systems in the airplane and IP-based equipment (e.g., passenger in-flight entertainment and applications, etc.). As another example, LRU C 120 may represent a terminal wireless LAN unit (TWLU) that serves as a wireless access bridge from the network 135 to a ground-based LAN, e.g., for gatelink applications. As yet another example, LRU D 120 may represent a cabin wireless LAN unit (CWLU) that serves as a wireless access bridge from the network 135 to devices operating in the cabin (e.g., personal devices, in-flight entertainment systems, etc.).

In one aspect, the LRUs A 105, B 115, C 120, and D 125 are also components of an on-board public key infrastructure (PKI). The on-board PKI ensures that communications between the participating components remain secure. For instance, each LRU may generate a public/private key pair distinct to that LRU. Illustratively, LRU A public key 108, LRU A private key 109, LRU B public key 116, LRU B private key 117, LRU C public key 121, LRU C private key 122, LRU D public key 126, and LRU D private key 127 each represent public/private key pairs for the respective LRUs. The CA service 106 may certify each public key using certificate signing techniques.

As stated, the LRU A 105 represents a NFS unit. The LRU A 105 performs a variety of functions, such as Ethernet conversion, multicast routing, firewall protection, data loading, application hosting, and communication gateway. Further, the LRU A 105 may store data (operational data 113) that is critical to the operation of the airplane, such as information used to identify the airplane (airplane IDs) to ground and maintenance systems.

As stated above, losing the operational data due to failure of an LRU (e.g., the LRU A 105) is a concern. To address this issue, the LRU A 105 backs up the data to a storage media device 130. The storage media device 130 can be any type of removable storage device, e.g., a storage card, USB flash drive, etc. Further, to protect the operational data, the LRU A 105 may secure the data. To do so, the key selector/generator 110 may generate an encryption key using an Advanced Encryption Standard (AES) technique. The encryption/decryption component 111 encrypts the data using the generated AES key, resulting in encrypted data 131.

To ensure that an attacker does not compromise the AES encryption key, in one aspect, the key selector/generator 110 may generate an additional encryption key using PKI data from two or more of the other LRUs B 115, C 120, or D 125. To obtain such information from a given LRU, the key selector/generator 110 may initiate a transport layer security (TLS) connection with the LRU. The key selector/generator 110 may generate wrapping keys using any combination of the LRUs. For example, the key selector/generator 110 may use the LRU C public key 121 and the LRU D public key 126 as seeds as input in a hashing algorithm (e.g., SHA-256) to generate a wrapping key (wrapped encryption key 132). Thereafter, the encryption/decryption component 111 secures the AES key using the wrapping key.

To recover the encrypted data (e.g., in the event that the LRU A 105 fails and is replaced), the key selector/generator executing on the replacement LRU A determines which combination of LRU keys were used to generate the wrapping key. The key selector/generator then recreates the wrapping key from the combination. The encryption/decryption component on that LRU A may then unwrap the AES encryption key. In turn, the encryption/decryption component uses the AES encryption key to decrypt the encrypted data 131.

In one aspect, the generated AES encryption key may also be used as a secret key for MAC generation. The MAC generation component 112 may create a MAC for unencrypted data maintained in the storage media device 130. Doing so preserves the integrity of any data sets maintained in the storage media device 130, such that any manipulation or modification of the data can easily be detected. To further preserve data integrity, the encryption/decryption component 111 can wrap the AES encryption key using the same techniques described above, i.e., the encryption key remains inaccessible unless securing operational data or generating a MAC for unencrypted data.

Figure 2:
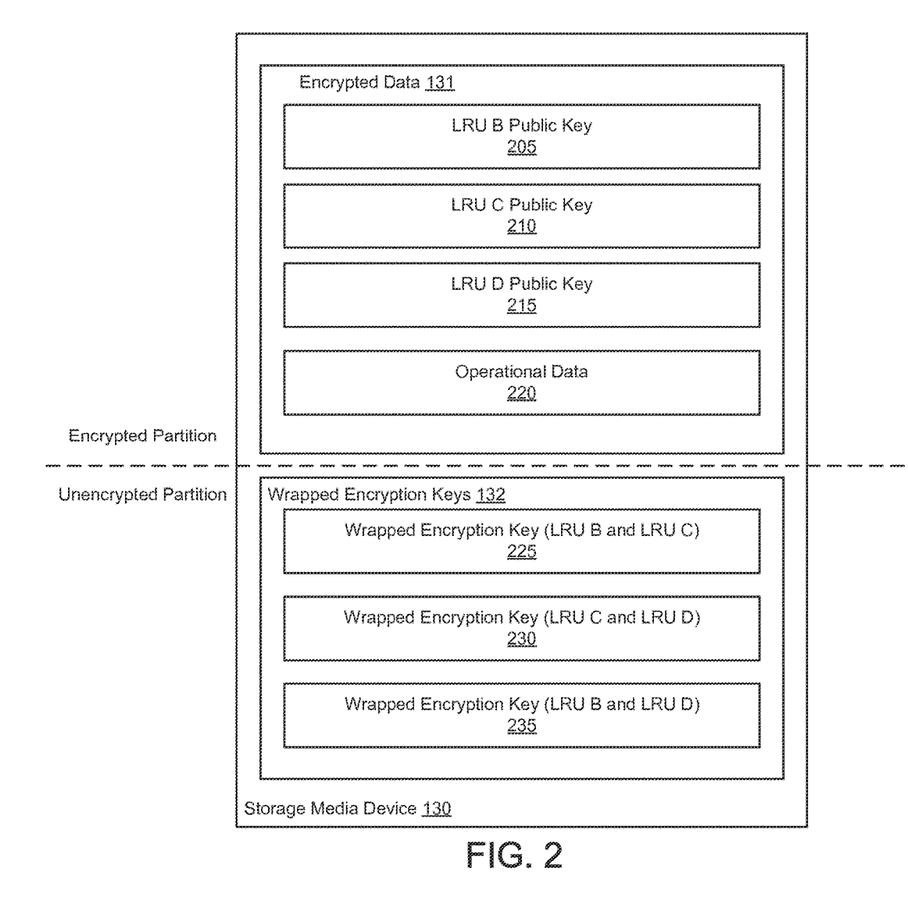
FIG. 2 further illustrates the storage media device described relative to FIG. 1, according to one aspect.

FIG. 2 further illustrates the storage media device 130 described relative to FIG. 1, according to one aspect. Illustratively, the storage media device 130 is partitioned into two sections, represented by the dotted line. The bottom portion represents an unencrypted partition. The top portion represents an encrypted partition. In one aspect the storage media device 130 may include multiple encrypted partitions. Doing so allows the CA service 106 to roll encryption keys.

As shown, the encrypted portion of the storage media device 130 includes the encrypted data 131. The encrypted data 131 itself includes a copy of the LRU B public key 205, the LRU C public key 210, the LRU D public key 215, and operational data 220. As stated, the encryption/decryption component 111 may encrypt operational data using an AES key generated by the key selector/generator 110.

As shown, the unencrypted partition of the storage media device 130 includes the wrapped encryption keys 132. In one aspect, the key selector/generator 110 may generate various AES encryption keys based on a combination of existing LRUs participating in the on-board PKI (e.g., LRU B 115, LRU C 120, and LRU D 125). For instance, the wrapped encryption keys 132 includes a wrapped encryption key 225 that is generated based on the LRU B public key 116 and the LRU C public key 121. The wrapped encryption keys 132 also includes a wrapped encryption key 230 that is generated based on LRU C public key 121 and LRU D public key 126. The wrapped encryption keys 132 also includes a wrapped encryption key 235 that is generated based on LRU public key 116 and LRU D 235. The key selector/generator 110 may create AES encryption keys as needed to enhance security of data encrypted via any combination of LRU PKI information.

Further, the unencrypted partition of the storage media device 130 may include fingerprints of the public keys used to encrypt the encrypted data 131. Each fingerprint uniquely identifies the respective public key. The key selector/generator 110 may evaluate the fingerprints to determine which public keys are needed to generate the appropriate wrapping key. Doing so allows the key selector/generator 110 to retrieve the public keys from the associated LRUs to generate the wrapping key (e.g., when decrypting the encrypted data 131).

Figure 3:
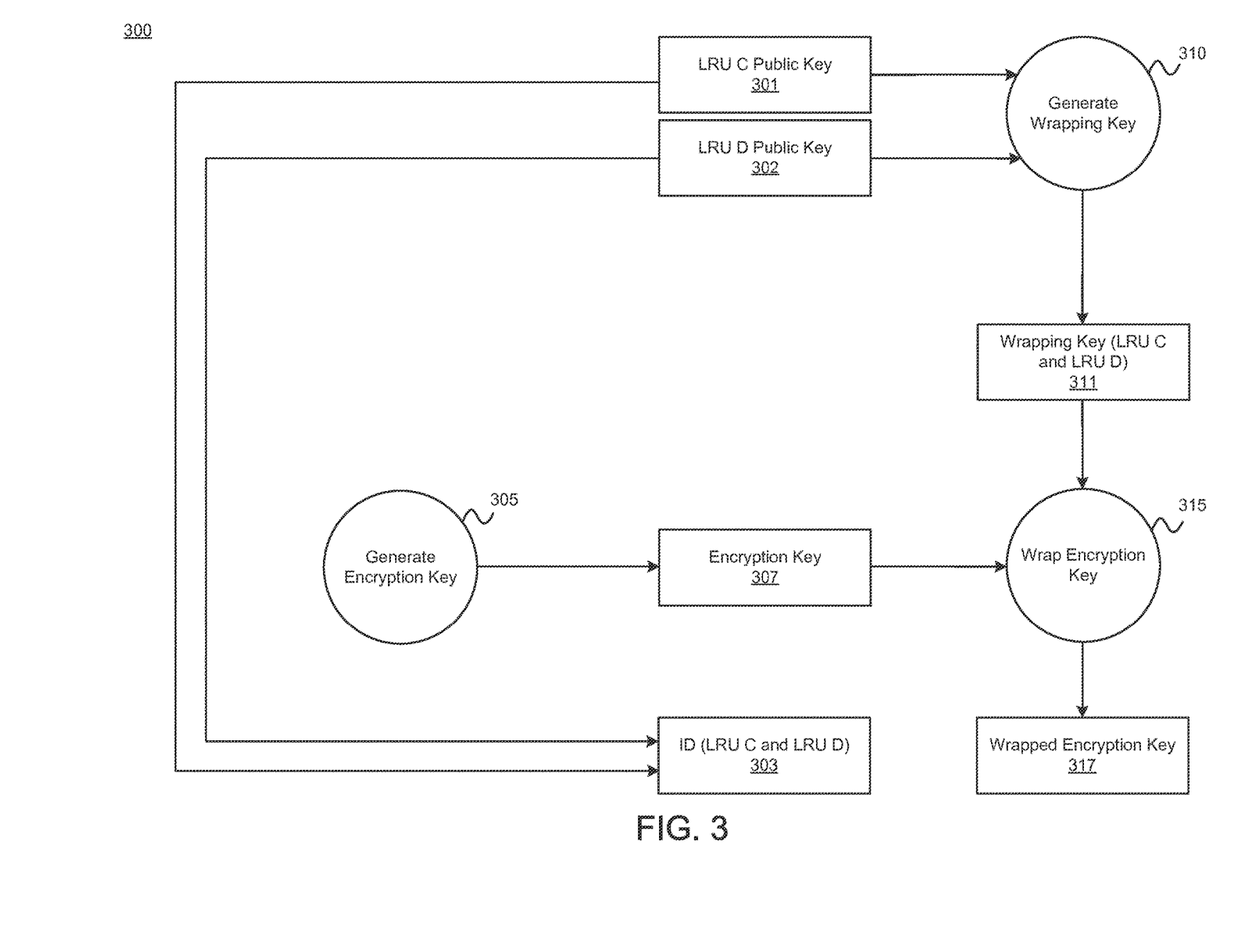
FIG. 3 illustrates an example flow of wrapping an encryption key used to secure operational data, according to one aspect.

FIG. 3 illustrates an example flow 300 of wrapping an AES encryption key used to secure operational data, according to one aspect. At 305, the key selector/generator generates an encryption key 307 using AES key generation techniques. At 310, the key selector/generator also generates an encryption key 311 used to wrap the AES encryption key 307. For example, illustratively, the key selector/generator 110 may retrieve public keys 301 and 302 from LRU C and LRU D (respectively) and use the keys as seeds for generating the wrapping key 311. The public keys 301 and 302 may include ID information 303 associated with the LRUs C and D.

As stated, the encryption/decryption component may use the AES encryption key 307 to encrypt critical operational data, sign unencrypted data to generate a MAC for the unencrypted data, etc. At 315, the encryption/decryption component wraps the AES encryption key using the generated wrapping key 317. The LRU A may store the wrapped encryption key 317 on the storage media device in an unencrypted partition.

Figure 4:
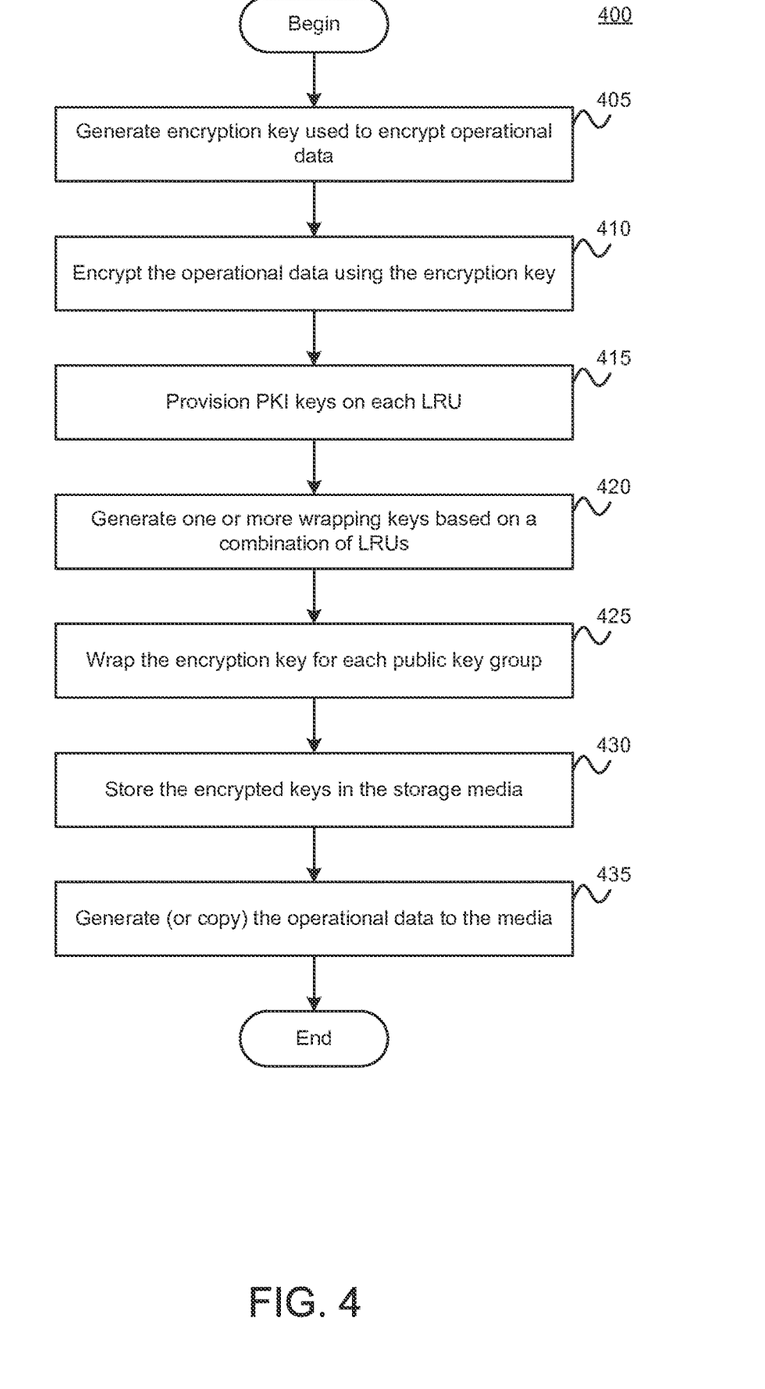
FIG. 4 illustrates a method for securing operational data to a storage media device, according to one aspect.

FIG. 4 illustrates a method 400 for securing operational data to a storage media device, according to one aspect. In particular, method 400 describes an example of securing critical operational data maintained by the LRU A 105. As shown, method 400 begins at step 405, where the key selector/generator 110 generates an AES encryption key (to use in encrypting operational data stored in the storage media device 130). At step 410, the encryption/decryption component 111 encrypts the operational data using the AES encryption key.

At step 415, the CA service 106 provisions PKI keys on each LRU. Each LRU may generate a public/private key pair using known key generation techniques. The CA service 106 may then certify each key pair for use in the on-board PKI. At step 420, the key selector/generator 110 generates one or more wrapping keys based on a combination of public keys of LRUs other than the LRU A 105 in the PKI (e.g., LRU B 115, LRU C 120, or LRU D 125).

At step 425, the encryption/decryption component 111 then encrypts the AES key using the wrapping keys. At step 430, the key selector/generator 110 stores the wrapped encryption keys in the storage media device 130 in the clear. Further, the key selector/generator 110 may generate fingerprint data of the LRU public keys used to wrap the AES key. Doing so allows the key selector/generator 110 to identify the public keys (e.g., when decrypting the wrapped AES encryption key). At step 435, the encryption/decryption component 111 copies the encrypted operational data to the storage media device 130.

Figure 5:
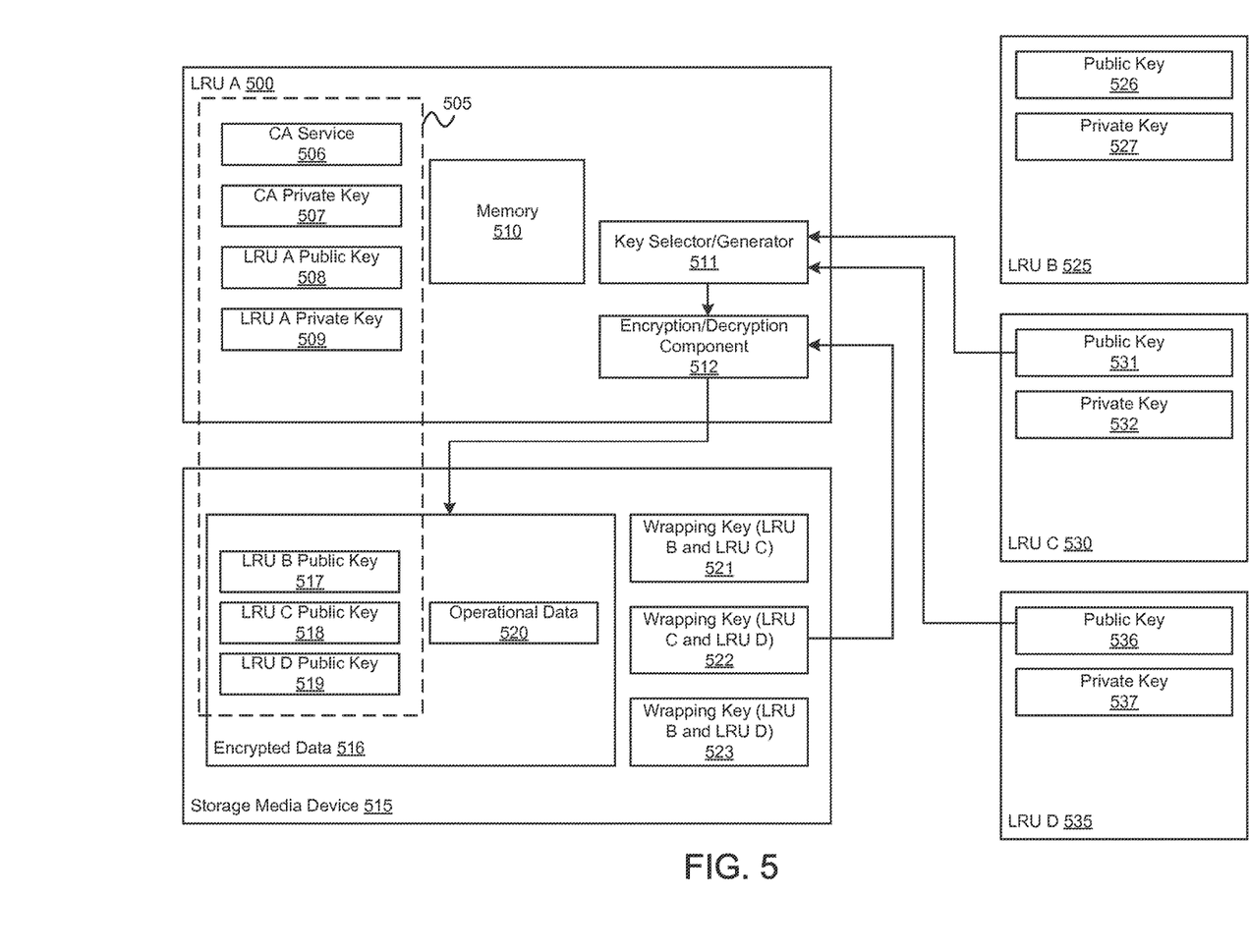
FIG. 5 illustrates an example of restoring operational data to a line-replaceable unit (LRU), according to one aspect.

FIG. 5 illustrates an example 500 of restoring operational data to a line-replaceable unit (LRU), according to one aspect. As shown, the example 500 includes a LRU A 500, storage media device 515, LRU B 525, LRU C 530, LRU D 535. In this example, assume that a previously running LRU A fails and is replaced with the LRU A 500 that has been initialized in the computing environment. The LRU A 500 further includes a CA service 506, a CA private key 507, a LRU A public key 508, LRU A private key 509, a memory 510, a key selector/generator 511, and an encryption/decryption component 512. The storage media device 515 includes encrypted data 516, wrapped encryption key 521, wrapped encryption key 522, and wrapped encryption key 523. The LRU B includes a public key 526 and a private key 527. The LRU C includes a public key 531 and a private key 532. The LRU D 535 includes a public key 536 and a private key 537.

The encrypted data 516 includes a corresponding LRU B public key 517, LRU C public key 518, and a LRU D public key 519. The CA service 506, CA private key 507, LRU A public key 508, LRU A private key 509, LRU B public key 517, LRU C public key 518, and the LRU D public key 519 represents an on-board PKI 505 for an airplane. The contents of the storage media device 515 (e.g., the encrypted data 516 and wrapping keys) have been previously provisioned prior to failure of the previous LRU A.

To restore operational data 520 to the memory 510 of the LRU A 500, the key selector/generator 511 determines which combination of LRU keys was used to encrypt the data 516. To do so, the key selector/generator 511 may identify the combination based on fingerprints stored in the storage media device 515 (not shown) that correspond to the public keys used. Illustratively, the key selector/generator 511 identifies public keys 531 and 536 (from LRU C 530 and LRU D 535, respectively). The key selector/generator 511 may initiate a TLS session with the LRU C 530 and LRU D 535 to retrieve the public keys 531 and 536.

The encryption/decryption component 512 may retrieve the wrapped encryption key 522, which corresponds to the AES encryption key wrapped using the combination of the public keys 531 and 536. The key selector/generator 511 generates a wrapping key based on the public keys 531 and 536. The encryption/decryption component 512 then decrypts the operational data 520 using the generated key. Doing so allows the LRU A 500 to retrieve and store the operational data 520 in the memory 510.

Figure 6:
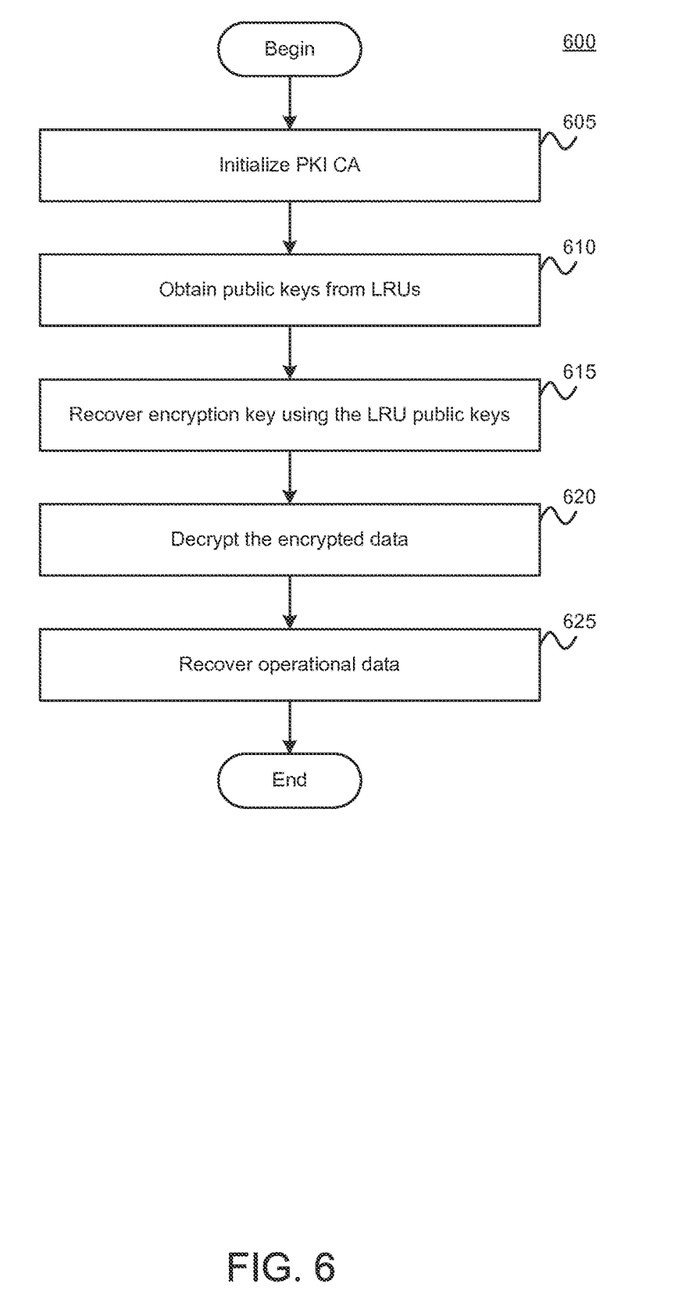
FIG. 6 illustrates a method for restoring operational data to a LRU, according to one aspect.

FIG. 6 illustrates a method 600 for restoring operational data to a LRU, according to one aspect. Assume that a single-point-of-failure LRU (e.g., LRU A) has failed and is replaced with a new corresponding LRU (e.g., LRU A 500, as depicted in FIG. 5). Assume that the storage media device (e.g., storage media device 515) is removed from the failed LRU and attached to the replacement LRU.

As shown, the method 600 begins at step 605, where the key selector/generator obtains the public keys used to generate the wrapping key from the associated LRUs. To do so, the key selector/generator may determine which public keys were used in generating a wrapping key for encrypting an AES key used to encrypt the operational data, e.g., by evaluating fingerprint data stored on the storage media device. The key selector/generator then initiates a TLS session with each LRU. Doing so allows the key selector/generator to securely obtain the public keys from the LRUs. At step 610, the key selector/generator reproduces the wrapping key by generating a key based on the obtained public keys. The encryption/decryption component executing on the LRU may then unwrap the AES encryption key using the wrapping key.

At step 615, the encryption/decryption component decrypts the encrypted data on the storage media device. The LRU A may recover the operational data from the encrypted data (at step 620), and thereafter store the unencrypted operational data in memory on the LRU A. At step 625, the LRU A may initialize the CA service executing on the LRU A. The CA service revokes the present key data maintained in the LRUs. In turn, each of the LRUs re-generate public/private key pairs and certify the new keys with the initialized CA of LRU A. The LRU A may re-encrypt the operational data using the newly generated public keys and store the encrypted operational data in the storage media device.

Figure 7:
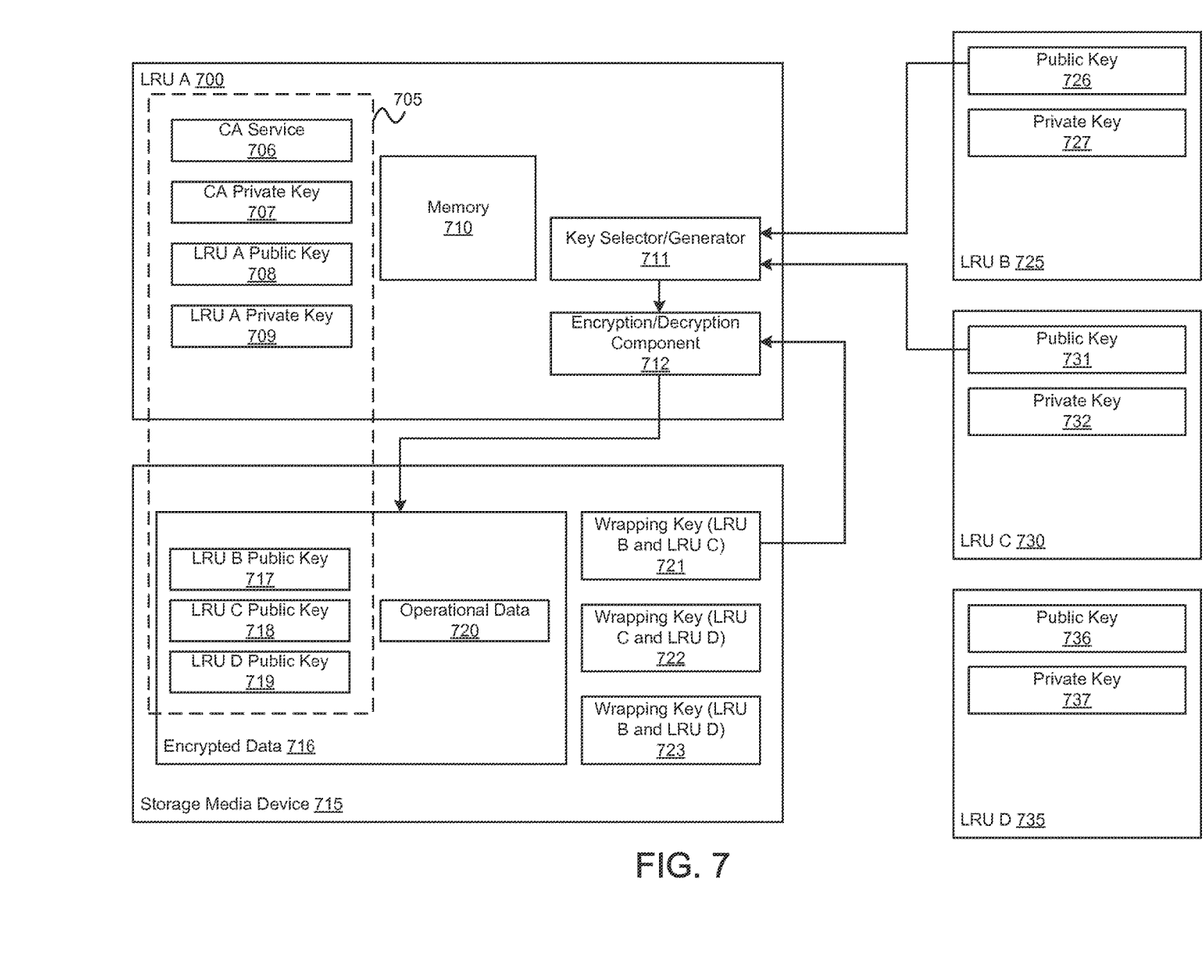
FIG. 7 illustrates an example of securing operational data to a storage media device after failure of a LRU, according to one aspect.

FIG. 7 illustrates an example 700 of securing operational data to a storage media device after failure of a LRU, according to one aspect. In particular, the example 700 describes processes that occur in the event that a LRU other than the LRU A fails. That is, in the event that one of the LRUs having a public key used to generate a wrapping key fails, it is desirable to revoke existing PKI keys and re-encrypting the operational data. In this example, assume that each of the public keys depicted in the Figure have been newly generated. In this example, assume that the LRU D has failed and is replaced with a new LRU D 735. The computing environment depicted in FIG. 7 includes a LRU A 700. The LRU A 700 further includes a CA service 706, a CA private key 707, a LRU A public key 708, LRU A private key 709, a memory 710, a key selector/generator 711, and an encryption/decryption component 712. The storage media device 715 includes encrypted data 716, wrapped encryption key 721, wrapped encryption key 722, and wrapped encryption key 723. The LRU B includes a public key 726 and a private key 727. The LRU C includes a public key 731 and a private key 732. The LRU D 735 includes a public key 736 and a private key 737.

The encrypted data 716 includes a corresponding LRU B public key 717, LRU C public key 718, and a LRU D public key 719. The CA service 706, CA private key 707, LRU A public key 708, LRU A private key 709, LRU B public key 717, LRU C public key 718, and the LRU D public key 719 represents an on-board PKI 705 for an airplane. The contents of the storage media device 715 (e.g., the encrypted data 716 and wrapping keys) have been previously provisioned prior to failure of the previous LRU A.

The CA service 706, upon detecting that one of the LRUs fails (or otherwise goes offline), may revoke key pairs of the LRUs. Each LRU may generate a new key pair and re-certify the key pair with the CA service 706. Further, the key selector/generator 711 may generate a new AES used to encrypt the operational data. Further still, the key selector/generator 711 may determine a new combination of LRU public keys for generating a wrapping key for encrypting data (and/or being used as a signing key for generating a MAC for unencrypted data on the storage media device). Illustratively, the key selector/generator 711 generates the wrapping key using the LRU B public key 726 and the LRU C public key 731. In addition, the key selector/generator 711 generates wrapping keys using various combinations of LRU public key data. The encryption/decryption component 712 may re-encrypt the data using the AES encryption key. Thereafter, the encryption/decryption component 712 may encrypt the AES encryption key using a selected wrapping key. The key selector/generator 711 may store the wrapped encryption keys on the storage media device 715.

Figure 8:
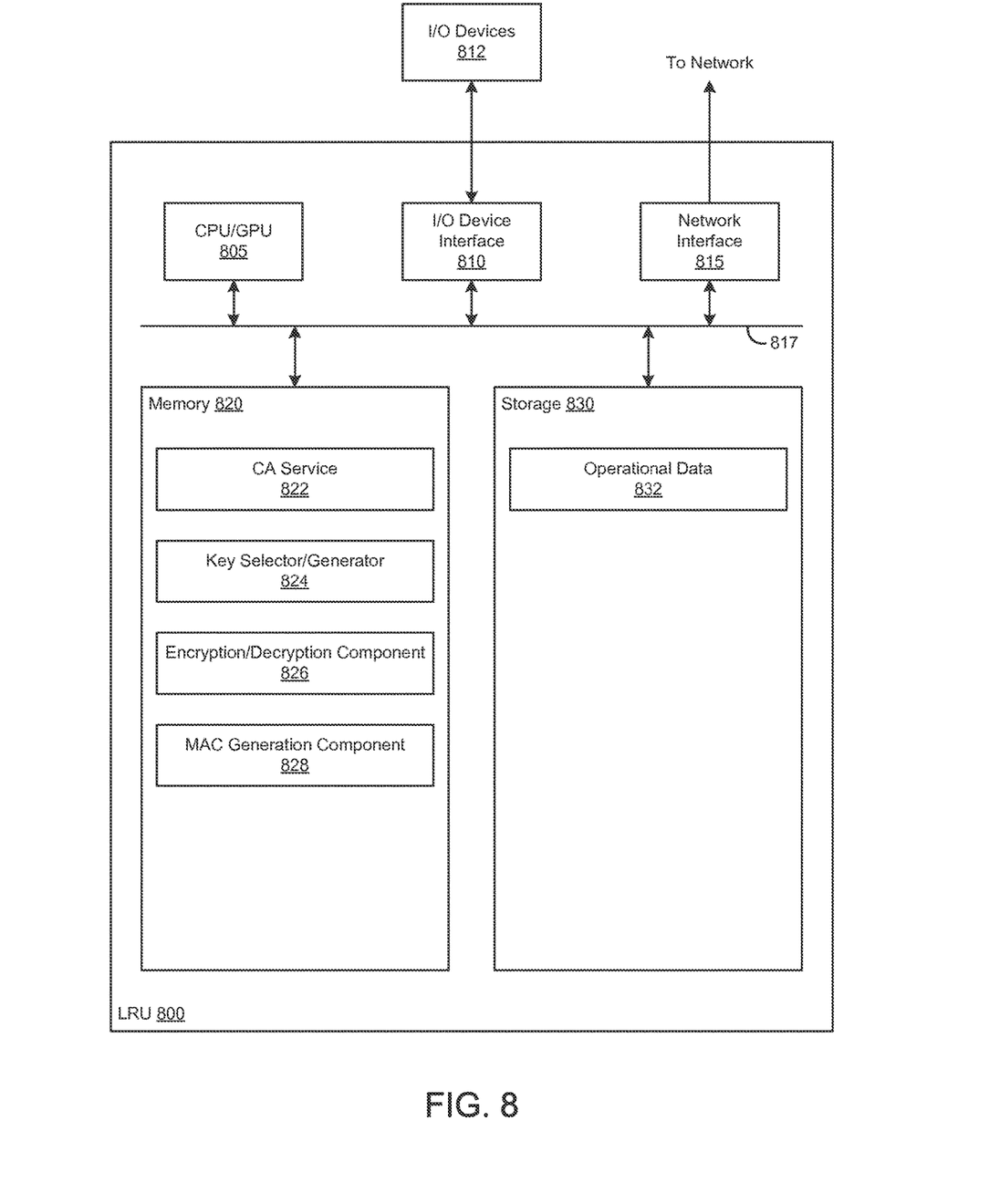
FIG. 8 illustrates an example LRU configured to secure operational data to a storage media device, according to one aspect.

FIG. 8 illustrates an example line-replaceable unit (LRU) 800 configured to secure operational data to a storage media device, according to one aspect. As shown, LRU 800 includes, without limitation, a central processing unit (CPU) 805, a network interface 815, a memory 820, and storage 830, each connected to a bus 817. The LRU 800 may also include an I/O device interface 810 connecting I/O devices 812 to the LRU 800. Further, in context of the present disclosure, the computing elements shown in the LRU 800 may correspond to a physical computing system operating in an airplane.

CPU 805 retrieves and executes programming instructions stored in memory 820 as well as stores and retrieves application data residing in the storage 830. The bus 817 is used to transmit programming instructions and application data between CPU 805, I/O devices interface 810, storage 830, network interface 815, and memory 820. Note, CPU 805 is included to be representative of a single CPU, multiple CPUs, a single CPU having multiple processing cores, and the like. Memory 820 is generally included to be representative of a random access memory. Storage 830 may be a disk drive storage device. Although shown as a single unit, storage 830 may be a combination of fixed and/or removable storage devices, such as fixed disc drives, removable memory cards, or optical storage, network attached storage (NAS), or a storage area-network (SAN).

Illustratively, memory 820 includes a CA service 822, a key selector/generator 824, an encryption/decryption component 826, and a MAC generation component 828. And storage 830 includes operational data 832. In one aspect, the LRU 800 represents a network file server (NFS) for the airplane. The LRU 800 maintains the operational data 832, which may be critical to the operation of the airplane. The LRU 800 may maintain a backup of the operational data 832 in a removable storage media device (not shown).

To secure the operational data 832, the key selector/generator 824 generates an encryption key, e.g., using an AES key generation algorithm. Further, the key selector/generator 824 generates one or more other encryption keys used to wrap the AES encryption key. Each wrapping key may be generated based on PKI data (e.g., public keys) of two or more other LRUs operating within the airplane. The encryption/decryption component 826 may encrypt the operational data 832 and store the encrypted data in the removable storage media device. Further, the MAC generation component 828 may generate, based on the AES encryption key, a MAC for unencrypted data sets stored on the storage media device.

The encryption/decryption component 826 may encrypt the AES encryption key using one of the generated wrapping keys. Once wrapped, the encryption/decryption component 826 stores the wrapped key in an unencrypted partition of the removable storage media device. The encryption/decryption component 826 may also store fingerprint data of the public keys used to generate the wrapping key.

The descriptions of the various aspects of the present disclosure have been presented for purposes of illustration, but are not intended to be exhaustive or limited to the aspects disclosed. Many modifications and variations will be apparent to those of ordinary skill in the art without departing from the scope and spirit of the described aspects. The terminology used herein was chosen to best explain the principles of the aspects, the practical application or technical improvement over technologies found in the marketplace, or to enable others of ordinary skill in the art to understand the aspects disclosed herein.

In the following, reference is made to aspects presented in this disclosure. However, the scope of the present disclosure is not limited to specific described aspects. Instead, any combination of the following features and elements, whether related to different aspects or not, is contemplated to implement and practice contemplated aspects. Furthermore, although aspects disclosed herein may achieve advantages over other possible solutions or over the prior art, whether or not a particular advantage is achieved by a given aspect is not limiting of the scope of the present disclosure. Thus, the following aspects, features, and advantages are merely illustrative and are not considered elements or limitations of the appended claims except where explicitly recited in a claim(s).

Aspects of the present disclosure may take the form of an entirely hardware aspect, an entirely software aspect (including firmware, resident software, micro-code, etc.) or an aspect combining software and hardware aspects that may all generally be referred to herein as a "circuit," "module" or "system."

The present disclosure may be a system, a method, and/or a computer program product. The computer program product may include a non-transitory computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some aspects, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the aspects presented herein.

Aspects of the present disclosure are described herein with reference to flowchart illustrations and/or block diagrams of methods, apparatus (systems), and computer program products according to aspects presented herein. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various aspects of the present disclosure. In this regard, each block in the flowchart or block diagrams may represent a module, segment, or portion of instructions, which comprises one or more executable instructions for implementing the specified logical function (s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the foregoing is directed to aspects of the present disclosure, other and further aspects of the present disclosure may be devised without departing from the basic scope thereof, and the scope thereof is determined by the claims that follow.

What is claimed is:

1. A method, comprising:
   generating, by a first line-replaceable unit (LRU) of a plurality of LRUs, a first encryption key;
   encrypting specified data using the first encryption key, wherein the encrypted specified data is stored as backup data in a storage media device removably attached to the first LRU;
   generating, by the first LRU, a second encryption key by combining key data for each of at least two other LRUs of the plurality of LRUs, the at least two other LRUs including a second LRU and a third LRU; and
   encrypting the first encryption key using the second encryption key.

2. The method of claim 1, further comprising:
   storing the encrypted specified data and the encrypted first encryption key in the storage media device.

3. The method of claim 2, further comprising:
   generating, by a replacement LRU for the first LRU, the second encryption key based on the key data of at least the second LRU;
   decrypting the encrypted first encryption key stored in the storage media device;
   decrypting the encrypted specified data; and
   restoring the specified data to the replacement LRU.

4. The method of claim 1, further comprising, prior to encrypting the first encryption key using the second encryption key:
   generating a message authentication code (MAC) for one or more data sets maintained in the storage media device, wherein the MAC is generated using the first encryption key as a signing key.

5. The method of claim 1, further comprising, prior to generating the second encryption key:
   initiating a Transport Layer Security (TLS) connection with at least the second LRU; and
   retrieving, via the TLS connection, the key data from the second LRU.

6. A non-transitory computer-readable medium having instructions, which, when executed, perform an operation comprising:
generating, by a first line-replaceable unit (LRU) in a plurality of LRUs, a first encryption key;
encrypting specified data using the first encryption key, wherein the encrypted specified data is stored as backup data in a storage media device removably attached to the first LRU;
generating, by the first LRU, a second encryption key by combining key data for each of at least two other LRUs of the plurality of LRUs, the at least two other LRUs including a second LRU and a third LRU; and
encrypting the first encryption key using the second encryption key.

7. The non-transitory computer-readable medium of claim 6, wherein the operation further comprises:
storing the encrypted specified data and the encrypted first encryption key in the storage media device.

8. The non-transitory computer-readable medium of claim 7, wherein the operation further comprises:
generating, by a replacement LRU for the first LRU, the second encryption key based on the key data of at least the second LRU;
decrypting the encrypted first encryption key stored in the storage media device;
decrypting the encrypted specified data; and
restoring the specified data to the replacement LRU.

9. The non-transitory computer-readable medium of claim 6, wherein the operation further comprises, prior to encrypting the first encryption key using the second encryption key:
generating a message authentication code (MAC) for one or more data sets maintained in the storage media device, wherein the MAC is generated using the first encryption key as a signing key.

10. The non-transitory computer-readable medium of claim 6, wherein the operation further comprises, prior to generating the second encryption key:
initiating a Transport Layer Security (TLS) connection with at least the second LRU; and
retrieving, via the TLS connection, the key data from the second LRU.

11. A system representing a first line-replaceable unit (LRU) of a plurality of LRUs, the system comprising:
a processor; and
a memory storing program code, which, when executed on the processor, performs an operation comprising:
generating a first encryption key;
encrypting specified data using the first encryption key, wherein the encrypted specified data is stored as backup data in a storage media device removably attached to the system;
generating a second encryption key by combining key data for each of at least two other LRUs of the plurality of LRUs, the at least two other LRUs including a second LRU and a third LRU; and
encrypting the first encryption key using the second encryption key.

12. The system of claim 11, wherein the operation further comprises:
storing the encrypted specified data and the encrypted first encryption key in the storage media device.

13. The system of claim 11, wherein the operation further comprises, prior to encrypting the first encryption key using the second encryption key:
generating a message authentication code (MAC) for one or more data sets maintained in the storage media device, wherein the MAC is generated using the first encryption key as a signing key.

14. The system of claim 11, wherein the operation further comprises, prior to generating the second encryption key:
initiating a Transport Layer Security (TLS) connection with at least the second LRU; and
retrieving, via the TLS connection, the key data from the second LRU.

15. The method of claim 1, wherein the key data for each of the two or more LRUs comprises a portion of a respective public key on the respective LRU.

16. The method of claim 1, wherein the first encryption key is encrypted using the second encryption key in order to safeguard the specified data from unauthorized access in an event that the storage media device is removed from the first LRU, wherein the specified data is safeguarded provided that fewer than all of the at least two other LRUs is compromised, wherein the specified data is safeguarded in a manner that also permits the specified data to be recovered by attaching the storage media device to a replacement LRU for the first LRU subsequent to failure of the first LRU.

17. The method of claim 16, wherein the storage media device includes an encrypted partition and an unencrypted partition, wherein the encrypted specified data is stored in the encrypted partition of the storage media device;
wherein the plurality of LRUs operate in an airplane, wherein the specified data comprises operational data of the airplane, wherein the operational data includes information to identify the airplane to ground systems and maintenance systems;
wherein the first encryption key is encrypted by operation of one or more computer processors of the first LRU in order to generate a wrapped encryption key, wherein the wrapped encrypted key is stored on the unencrypted portion of the storage media device.

18. The method of claim 17, wherein the key data for each of the two or more other LRUs comprises at least a portion of a respective public key of the respective LRU, wherein the plurality of LRUs include a network file server (NFS) of the airplane, a network extension device (NED) of the airplane, a terminal wireless local area network (LAN) unit (TWLU) of the airplane, and a cabin wireless LAN unit (CWLU) of the airplane, wherein the second encryption key is not generated based on any key data for the first LRU, wherein the method comprises a computer-implemented method.

19. The method of claim 18, wherein the NFS performs a plurality of functions including operational-data storage, Ethernet conversion, multicast routing, firewall protection, data loading, application hosting, and communication gateway functions;
wherein the NED provides network routing functions between one or more avionics systems in the airplane and Internet Protocol (IP)-based equipment;
wherein the TWLU serves as a wireless access bridge from a local area network (LAN) of the airplane to a ground-based LAN;
wherein the CWLU serves as a wireless access bridge from the LAN of the airplane to a plurality of devices operating in a cabin of the airplane, the plurality of devices including an in-flight entertainment system and one or more personal devices.

20. The method of claim 19, wherein the NFS includes a plurality of NFS components including includes a certificate authority (CA) service, a CA private key, an NFS public key, an NFS private key, a key selector/generator, an encryption/decryption component, a message authentication code (MAC) generation component, and the operational data, wherein the CA service is configured to certify each public key in the plurality of LRUs, wherein the key data for each of the two or more other LRUs comprises the respective public key of the respective LRU.

21. The method of claim 20, further comprising:
prior to generating the second encryption key: (i) initiating a Transport Layer Security (TLS) connection with at least the second LRU and (ii) retrieving, via the TLS connection, the key data from the second LRU;
prior to encrypting the first encryption key using the second encryption key, generating the MAC for one or more data sets maintained in the storage media device, wherein the MAC is generated using the first encryption key as a signing key;
generating, by the replacement LRU for the first LRU, the second encryption key based on the key data of at least the second and third LRUs;
decrypting the encrypted first encryption key stored in the storage media device;
decrypting the encrypted specified data; and
restoring the specified data to the replacement LRU.

\* \* \* \* \*

UNITED STATES PATENT AND TRADEMARK OFFICE
CERTIFICATE OF CORRECTION

PATENT NO. : 10,083,325 B2
APPLICATION NO. : 14/942680
DATED : September 25, 2018
INVENTOR(S) : Ian Gareth Angus et al.

Page 1 of 1

It is certified that error appears in the above-identified patent and that said Letters Patent is hereby corrected as shown below:

In the Claims

In Column 14, Line 64, in Claim 20, delete "including includes" and insert -- includes --, therefor.

Signed and Sealed this
First Day of January, 2019

Andrei Iancu
*Director of the United States Patent and Trademark Office*